US009213571B2

(12) United States Patent
Ristovski et al.

(10) Patent No.: US 9,213,571 B2
(45) Date of Patent: Dec. 15, 2015

(54) SYSTEM AND METHOD FOR CHANGING ABILITIES OF A PROCESS

(75) Inventors: Aleksandar Ristovski, Ottawa (CA); Kevin Goodman, Nepean (CA); Brian John Stecher, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 61 days.

(21) Appl. No.: 13/490,180

(22) Filed: Jun. 6, 2012

(65) Prior Publication Data

US 2013/0333056 A1 Dec. 12, 2013

(51) Int. Cl.
*G06F 17/00* (2006.01)
*G06F 9/46* (2006.01)
*G06F 21/52* (2013.01)

(52) U.S. Cl.
CPC ............... *G06F 9/468* (2013.01); *G06F 21/52* (2013.01)

(58) Field of Classification Search
CPC .......... H04L 63/10; G06F 21/62; G06F 21/57
USPC ........... 726/1, 10, 21, 4, 20; 713/167; 703/26; 707/610
See application file for complete search history.

(56) References Cited

U.S. PATENT DOCUMENTS

| | | | | |
|---|---|---|---|---|
| 6,003,133 | A * | 12/1999 | Moughanni et al. | 726/4 |
| 6,279,111 | B1 * | 8/2001 | Jensenworth | G06F 21/335 713/159 |
| 7,124,403 | B2 * | 10/2006 | Price | G06F 9/542 717/126 |
| 7,152,242 | B2 * | 12/2006 | Douglas | 726/23 |
| 7,383,437 | B1 * | 6/2008 | Dik | 726/4 |
| 7,490,072 | B1 * | 2/2009 | Cowan et al. | 706/47 |
| 7,665,143 | B2 * | 2/2010 | Havens | G06F 21/51 713/164 |
| 7,703,081 | B1 * | 4/2010 | Buches | 717/127 |
| 7,720,671 | B2 * | 5/2010 | Leventhal et al. | 703/23 |
| 7,752,487 | B1 * | 7/2010 | Feeser et al. | 714/4.11 |
| 7,797,735 | B2 * | 9/2010 | Beilinson et al. | 726/4 |
| 8,015,204 | B2 * | 9/2011 | Kaler et al. | 707/783 |
| 8,136,147 | B2 * | 3/2012 | Koikara et al. | 726/4 |
| 8,166,554 | B2 * | 4/2012 | John | H04L 63/105 726/26 |
| 8,380,662 | B2 * | 2/2013 | Schneider | G06F 1/14 707/610 |
| 8,381,287 | B2 * | 2/2013 | Trotter | 726/20 |
| 8,381,306 | B2 * | 2/2013 | McPherson et al. | 726/27 |
| 8,650,396 | B2 * | 2/2014 | Manoharan et al. | 713/166 |
| 8,930,368 | B2 * | 1/2015 | Furuichi | G06F 17/30707 705/51 |
| 2004/0049693 | A1 * | 3/2004 | Douglas | 713/200 |
| 2008/0028440 | A1 * | 1/2008 | Basol | G06F 21/6281 726/3 |
| 2008/0133214 | A1 * | 6/2008 | Leventhal et al. | 703/26 |
| 2008/0155685 | A1 * | 6/2008 | Beilinson et al. | 726/21 |
| 2009/0228957 | A1 * | 9/2009 | Basol et al. | 726/4 |

(Continued)

OTHER PUBLICATIONS

Lupu EC, Conflicts in policy-based distributed systems management, Nov. 1999, IEEE, vol. 10, pp. 852-869.*

(Continued)

*Primary Examiner* — Dede Zecher
*Assistant Examiner* — Viral Lakhia
(74) *Attorney, Agent, or Firm* — Brinks Gilson & Lione

(57) ABSTRACT

A system and method wherein a set of privileges assigned to a process may be modified responsive to a request. The modification may apply to one or more abilities within the set of privileges and may be applied during execution of the process subsequent to the process creation time. Accordingly a process may be created with a default set of privileges and subsequently the privileges may be modified (e.g. to include a sub-set of the default privileges) thereby mitigating the risk of malicious exploitation of the process through attack.

25 Claims, 4 Drawing Sheets

(56) References Cited

U.S. PATENT DOCUMENTS

| | | | | |
|---|---|---|---|---|
| 2009/0328129 | A1* | 12/2009 | Desai et al. | 726/1 |
| 2010/0242083 | A1* | 9/2010 | Begum ............... G06F 21/6218 | 726/1 |
| 2011/0138476 | A1* | 6/2011 | Black ..................... G06F 9/468 | 726/27 |
| 2012/0054490 | A1* | 3/2012 | Rosu .................... H04W 4/003 | 713/165 |
| 2012/0054877 | A1* | 3/2012 | Rosu ..................... G06F 9/545 | 726/30 |
| 2013/0097356 | A1* | 4/2013 | Dang et al. | 711/6 |
| 2013/0317944 | A1* | 11/2013 | Huang ................ G01S 5/0252 | 705/26.61 |

OTHER PUBLICATIONS

Office Action issued in Canadian Patent Application 2,817,559, issued Oct. 14, 2014, pp. 1-3.

Office Action issued in European Patent Application 13170772.1, issued Feb. 23, 2015, pp. 1-10.

Johnson M. Hart, "Windows System Programming, Fourth Edition," pp. 1-26, Feb. 1, 2010; Pearson Education, Inc.

Microsoft Corporation, "CreateProcess Function," pp. 1-12, Jan. 25, 2010, Microsoft.com.

Extended European Search Report issued in European Patent Application 13170772.1, issued May 16, 2014, pp. 1-12.

* cited by examiner

SYSTEM AND METHOD FOR CHANGING ABILITIES OF A PROCESS

BACKGROUND OF THE INVENTION

1. Technical Field

The present disclosure relates to the field of computer executable processes and their associated abilities. In particular, to a system and method for changing abilities of a process.

2. Related Art

Computing platform operating systems may include mechanisms to enable or to restrict particular actions being taken by processes executing on a computing platform. These mechanisms may take the form of one or more abilities that can be assigned or denied to individual processes. The collection of abilities assigned to a process may be referred to as a set of privileges.

In multi-user operating systems, a set of privileges may be associated with each user (a.k.a. user-id). Each running process may be given the set of privileges that is associated with the owner (e.g. user-id) of the process. When a user-id is highly privileged, processes owned by the user-id may become targets for malicious exploitation in order to circumvent security measures on the computing platform.

BRIEF DESCRIPTION OF DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

On a computing platform a privilege is a permission to perform an action (a.k.a. an ability). In multi-user operating systems a set of privileges may be associated with each user identity (user-id) on the system; the set of privileges containing one or more abilities that are assigned to the user-id. Alternatively or in addition, a set of privileges may be associated with each of one or more group identities (group-id) and in turn with each user-id that is a member of each group-id. Some systems may include one or more user-ids that are designated as system administrator users (a.k.a. root user, root, or sys admin) that may be given all possible privileges.

Each process executing on the computing platform may be assigned a set of privileges. The set of privileges assigned to a process may be based on the set of privileges associated with the user-id of the owner of the process. The process may be assigned the set of privileges associated with the owner of the process at the time the process is created.

Processes that execute the core functions (a.k.a. kernel) of the operating systems or that are created during the start-up phase (a.k.a. boot sequence) of operation may be owned by a system administrator user-id that in UNIX®-like (UNIX is a registered trademark of The Open Group of San Francisco, Calif.) operating systems is referred to as 'root'. Processes that are owned by root can be said to run as root. Processes that run as root may be omnipotent (e.g. have all possible privileges). While using processes that are omnipotent facilitates the execution of the core operating system and start-up functions, it may also leave the system vulnerable to forms of attack that exploit the omnipotence of these processes.

Herein are described systems and methods wherein the set of privileges assigned to a process may be modified responsive to a request. The modification may apply to one or more abilities within the set of privileges and may be applied during execution of the process subsequent to the process creation time. Accordingly a process may be created with a default set of privileges and subsequently the privileges may be modified to include only a sub-set of the default privileges thereby mitigating the risk of malicious exploitation of the process through attack.

Figure 1:
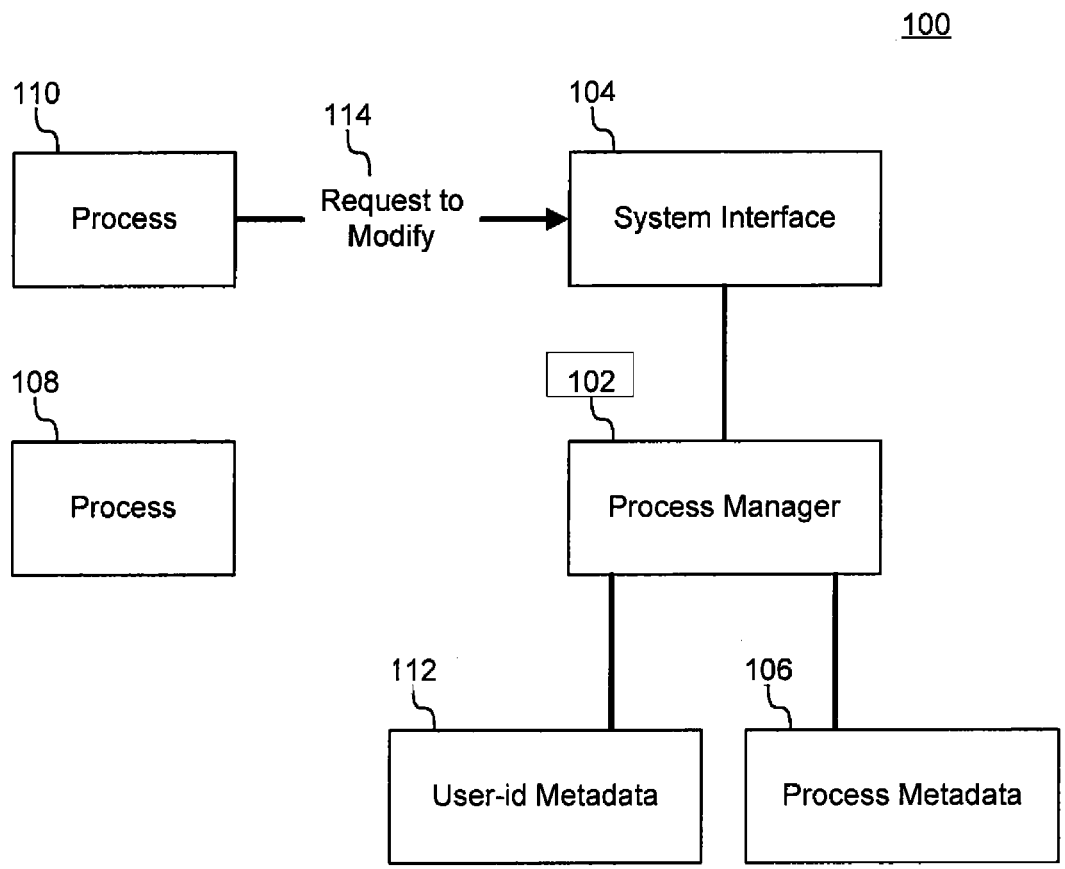
FIG. 1 is a schematic representation of a system for changing abilities of a process.

FIG. 1 is a schematic representation of a system for changing abilities of a process. The system 100 may comprise a process manager 102 and a system interface 104. The process manager 102 may be responsible for creating processes such as illustrated example processes 108 and 110 and for assigning a set of privileges to the processes at process creation time. The set of privileges assigned to a process 108 or 110 at process creation time may be based on a user-id of the owner of the process. The process manager 102 may obtain user-id and associated sets of privileges information from a user-id metadata repository 112. The process manager 102 may store and access information, related to the set of privileges assigned to each process, in a process metadata repository 106. A process 108 or 110 may send a request to modify 114 to the system interface 104. The system interface 104 may be a procedure, library, system entry point, application programming interface (API) or other similar interface. The request to modify 114 may contain a process identifier (pid) and one or more abilities and corresponding actions. The process identifier identifies a process 108 or 110 that is the object of the request to modify. The one or more abilities and corresponding actions represent the individual abilities to be assigned or de-assigned to the process. In response to receiving the request to modify 114 at the system interface 104, the process manager 102 may modify the abilities assigned to (e.g. authorized for) to the process, identified by the process identifier, and record the changes in the process metadata repository 106.

Figure 3:
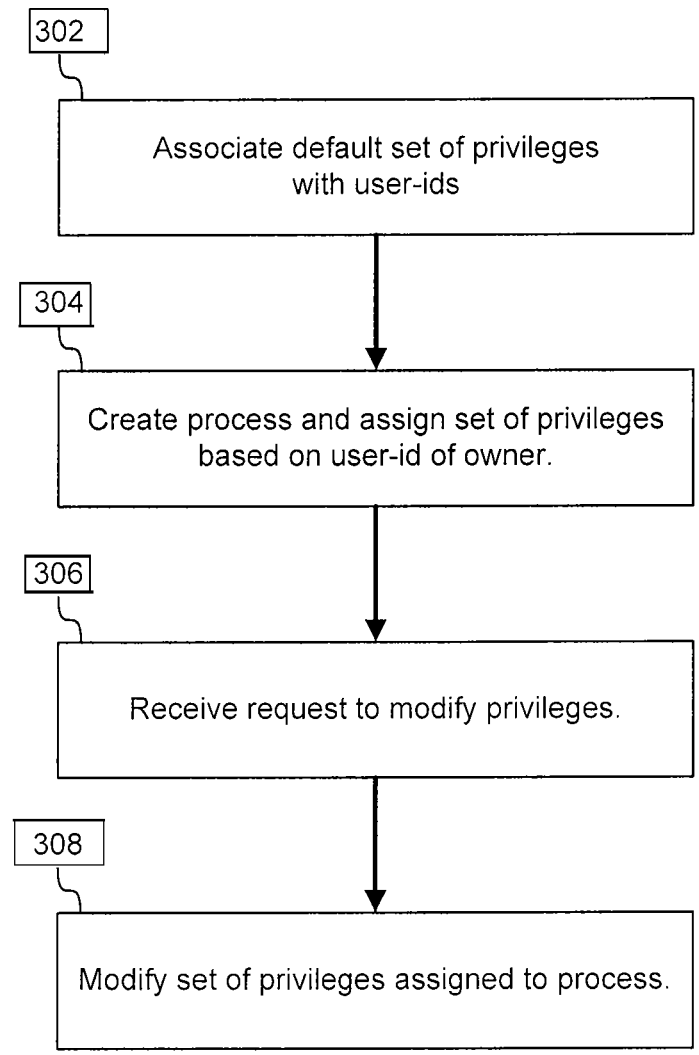
FIG. 3 is a flow diagram representing the logic in a method for changing abilities of a process.

FIG. 3 is a flow diagram representing the logic in a method for changing abilities of a process. A default set of privileges is associated with each of one or more user-ids 302. Each user-id identifies a user in an operating system on a computing platform. Each set of privileges comprises one or more abilities in the operating system that the associated user-id is authorized to have. A computer executable process is created and is assigned the set of privileges associated with the user-id that is the owner of the process 304. Each process created in the operating system may be owned by a user-id. The set of privileges, associated with the owner user-id, that is assigned to the process at creation time is a default set of privileges for the process. The assigned set of privileges comprises the abilities that the process is authorized to have while executing in the operating system. A request is received to modify the set of privileges assigned to the process 306. The request may be received through the invocation of an application programming interface (API) entry point such as, for example, a system call. The request to modify 114 the assigned set of privileges may be made by the process itself or by another process. The operating system may limit the making of the request to other processes that have the same owner (e.g. user-id) as the process that is the object of the request, or to other processes that have a particular owner such as, for example, the system administrator owner. The request to modify 114 the assigned set of privileges may comprise one or more ability identifiers and corresponding action identifiers. Table 1 contains some example abilities identifiers that may be included in the request to modify. The contents of Table 1 are for illustrative purposes and are not intended to be limiting in any way. Table 2 contains some example action identifiers that may be included in the request to modify. The contents of Table 2 are for illustrative purposes and are not intended to be limiting in any way. The request to modify 114 the set of privileges may comprise further elements such as, for example, a process identifier (pid) of the process that is the object of the request and, lower and upper limits for abilities for which a sub-range action identifiers has been specified.

The set of privileges assigned to the process are modified in accordance with the received request 308. The result of modifying the set of privileges may be to reduce the abilities for which the process is authorized (e.g. allowed) to a sub-set of the previously assigned set of privileges. The request to modify 114 may also result in more abilities being authorized for the process than were previously assigned. A request to modify may also result in some abilities being authorized while other abilities are de-authorized. The request to modify 114 may be constrained to not permit abilities that were not included in the set of privileges originally assigned to the process at action 304 from being authorized. More than one request to modify 114 may be received at different points of time in the lifespan of the process. The effects of multiple requests to modify 114 may be cumulative on the set of privileges assigned to the process.

TABLE 1

| Ability Identifier | Controls the process' ability to: | Sub-range (optional) |
| --- | --- | --- |
| PROCMGR_AID_CLOCKPERIOD | Change the clock period, using ClockPeriod( ) | Allowable periods, in nanoseconds |
| PROCMGR_AID_CLOCKSET | Set the clock, using clock_settime( ), settimeofday( ), ClockAdjust( ), or ClockTime( ) | Allowable times, in nanoseconds |
| PROCMGR_AID_CONFSET | Set configuration strings, using confstr( ) A | Allowable names (_CS_*) |
| PROCMGR_AID_CONNECTION | Use ConnectAttach( ) to establish a connection between a process and a channel-<br>Use ConnectFlags( ) to modify the flags associated with a connection<br>Use SyncMutexEvent( ) or SyncCtl( ) to attach a pulse to a mutex | — |
| PROCMGR_AID_CPUMODE | Change the CPU's power management mode | Allowable modes |
| PROCMGR_AID_EVENT | Trigger privileged system-wide events, using procmgr_event_trigger( ) | Trigger bits |
| PROCMGR_AID_FORK | Create a new process by calling fork( ) | — |
| PROCMGR_AID_GETID | Get the group ID or session ID of a process outside the calling process's session, by using getpgid( ) or getsid( ), respectively | — |
| PROCMGR_AID_INTERRUPT | Attach interrupt handlers by calling InterruptAttach( ), or events by calling InterruptAttachEvent( ). | Interrupt sources |
| PROCMGR_AID_IO | Request I/O privileges by calling ThreadCtl (_NTO_TCTL_IO, 0) | — |
| PROCMGR_AID_KEYDATA | Pass data through a common client, by calling MsgKeyData( ) | — |
| PROCMGR_AID_MAP_FIXED | Use mmap( ) with MAP_FIXED to map fixed addresses (including zero) | Allowable virtual addresses |
| PROCMGR_AID_MEM_ADD | Add physical memory | Allowable physical addresses |
| PROCMGR_AID_MEM_GLOBAL | Mark shared memory as being global across all processes, by calling shm_ctl( ) or shm_ctl_special( ), specifying SHMCTL_GLOBAL | — |
| PROCMGR_AID_MEM_LOCK | Lock a range of process address space into physical memory, by calling mlock( ) or mlockall( ) | Allowable virtual addresses |
| PROCMGR_AID_MEM_PEER | Manipulate a peer process's memory | Peer process IDs |
| PROCMGR_AID_MEM_PHYS | Map physical memory, by calling mmap( ), specifying MAP_PHYS, or by calling mmap_device_io( ) or mmap_device_memory( ) | The lower and upper physical address range |
| PROCMGR_AID_MEM_SPECIAL | Call shm_ctl_special( ) | — |
| PROCMGR_AID_PATHSPACE | Add items to the procnto pathname prefix space, specifically to create symbolic links by calling pathmgr_symlink( ), or to register names in the path space by calling resmgr_attach( ) | — |

TABLE 1-continued

| Ability Identifier | Controls the process' ability to: | Sub-range (optional) |
|---|---|---|
| PROCMGR_AID_PGRP | Set its process group ID, by calling setpgrp( ) or procmgr_session( ). This ability is enabled by default (for POSIX conformance). | Process IDs |
| PROCMGR_AID_PRIORITY | Use pthread_setschedparam( ), pthread_setschedprio( ), sched_setparam( ), sched_setscheduler( ), setprio( ), or SchedSet( ) to change its priority to one that's above the maximum allowed for unprivileged processes. Use pthread_mutexattr_setprioceiling( ), pthread_mutexattr_setprotocol( ), pthread_mutex_setprioceiling( ), SyncCtl( ), or SyncTypeCreate( ) to set the priority ceiling for a mutex to a value greater than the maximum allowed for unprivileged processes | Allowable priorities |
| PROCMGR_AID_PROT_EXEC | Load code by calling dlopen( ) or map memory as executable by calling mmap( ) with PROT_EXEC | Allowable virtual addresses |
| PROCMGR_AID_QNET | Used by Qnet when it creates a channel. | — |
| PROCMGR_AID_REBOOT | Cause the system to reboot by calling sysmgr_reboot( ) | — |
| PROCMGR_AID_RLIMIT | Use setrlimit( ) to raise hard limits on system resources | Limits (RLIMIT_*) that it can raise |
| PROCMGR_AID_RSRCDBMGR | Use the rsrcdbmgr*( ) functions to manipulate the resource database manager | — |
| PROCMGR_AID_RUNSTATE | Use sysmgr_runstate( ) and sysmgr_runstate_dynamic( ) to control a CPU's running state | Allowable CPU numbers |
| PROCMGR_AID_SCHEDULE | Use pthread_getschedparam( ), SchedGet( ), pthread_setschedparam( ), or SchedSet( ) to get or set the scheduling policy for a process whose real or saved user ID is different from the calling process's real or effective user ID | — |
| PROCMGR_AID_SESSION | Use procmgr_session( ) to change a character terminal's process group or to send a signal to a member of a session group | Allowable session IDs |
| PROCMGR_AID_SETGID | Set its group ID, effective group ID, real and effective group IDs, or supplementary group IDs by calling setgid( ), setegid( ), setregid( ), or setgroups( ), respectively | Allowable group IDs |
| PROCMGR_AID_SETUID | Use setuid( ) to set its user ID and effective user ID to values other than its real or saved-set user ID | Allowable user IDs |
| PROCMGR_AID_SIGNAL | Attach signal handlers to a process with a different real or effective user ID by calling sigaction( ), signal( ), or SignalAction( ) | Allowable signals |
| PROCMGR_AID_SPAWN | Spawn new processes by calling exec*( ), spawn*, or posix_spawn( ) | — |
| PROCMGR_AID_SPAWN_SETGID | Set the group ID of the child process when using posix_spawn( ) | Lower and upper bounds on the group IDs that the process can set the child process to |
| PROCMGR_AID_SPAWN_SETUID | Set the user ID of the child process when using posix_spawn( ) | Lower and upper bounds on the user IDs that the process can set the child process to |
| PROCMGR_AID_TIMER | Create a timer that sends a pulse by calling timer_create( ) or TimerCreate( )Get timer information by calling timer_getexpstatus( ), timer_getoverrun( ), timer_gettime( ), or TimerInfo( ) | Timer IDs |
| PROCMGR_AID_TRACE | Add handlers for trace events or allocate the instrumented kernel's trace buffers by calling TraceEvent( ) | — |

TABLE 1-continued

| Ability Identifier | Controls the process' ability to: | Sub-range (optional) |
|---|---|---|
| PROCMGR_AID_UMASK | Use umask( ) to change the file-mode creation mask for a process with a different effective user ID | — |
| PROCMGR_AID_V86 | Call_intr_v86( ) | — |
| PROCMGR_AID_WAIT | Use wait( ), wait3( ), wait4( ), waitid( ), or waitpid( ) to wait for the status of a terminated child process whose real or saved user ID is different from the calling process's real or effective user ID | Child process IDs |

TABLE 2

| Action Identifier | Action to be taken: |
|---|---|
| PROCMGR_AOP_DENY | Disallow the performance of the operation in the specified domain(s). |
| PROCMGR_AOP_ALLOW | Allow the performance of the operation in the specified domain(s). You must be root when doing this for privileged abilities. |
| PROCMGR_AOP_SUBRANGE | Restrict the feature to set its "parameter" to a certain subrange in the specified domain(s). The meaning of the "parameter" varies, depends on the ability, as described in Table 1. |
| PROCMGR_AOP_LOCK | Lock the current ability so that no further changes to it can be made. |
| PROCMGR_AOP_INHERIT_YES | The changes to the ability are inherited across a spawn or exec. |
| PROCMGR_AOP_INHERIT_NO | The changes to the ability aren't inherited across a spawn or exec. This is the default. |
| PROCMGR_ADN_ROOT | Modify the ability of the process when it's running as root. |
| PROCMGR_ADN_NONROOT | Modify the ability of the process when it isn't running as root. |

Figure 4:
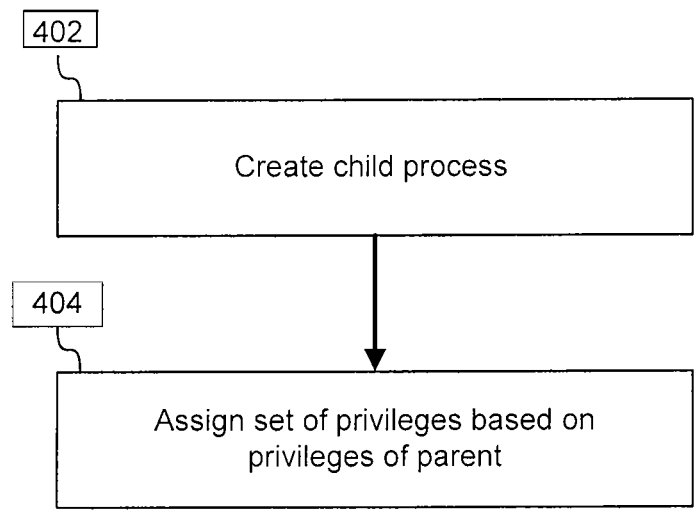
FIG. 4 is a flow diagram representing further logic in a method for changing abilities of a process.

FIG. 4 is a flow diagram representing further logic in a method for changing abilities of a process. The process may create a child process 402. The child process may be created using any mechanism provided by the operating system including, for example, the fork( ) and spawn( ) mechanisms available in UNIX®-like operating systems. The child process may be assigned the set of privileges assigned to it's parent process 404 and thereby inherits it's parent process' set of privileges. The process may create more than one child process in which case the actions 402 and 404 may be repeated for each child process. The set of privileges assigned to the process may change (e.g. when a request to modify 114 is received as described with reference to FIG. 3) between instances of creating a child process. Each child process may be assigned the set of privileges assigned to it's parent process at the time of child process creation. Child processes may in turn create their own child processes in which case the actions 402 and 404 may be applied for each child's child.

Figure 2:
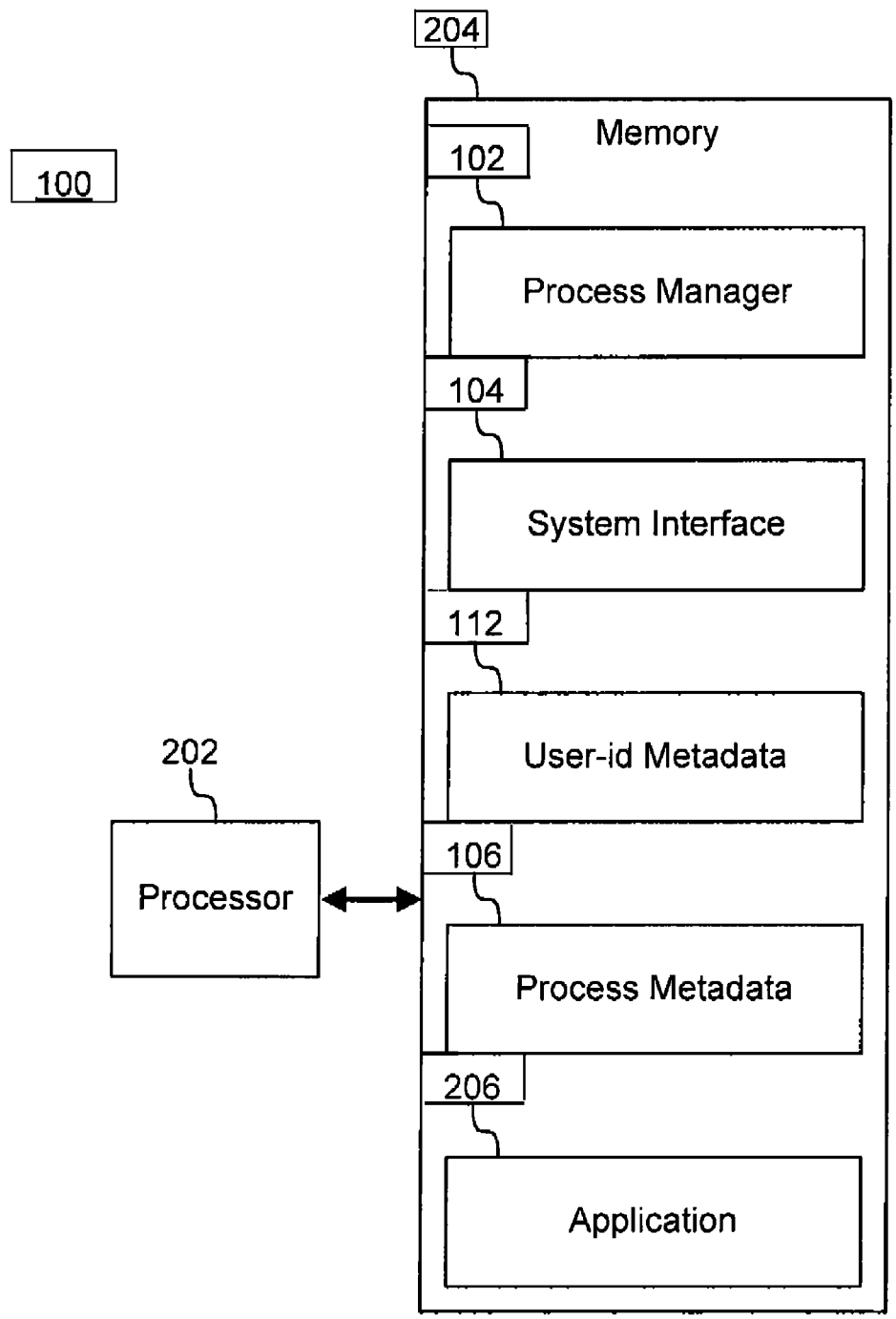
FIG. 2 is a further schematic representation of components of a system for changing abilities of a process.

FIG. 2 is a further schematic representation of components of a system for changing abilities of a process. The system 100 may comprise a processor 202 and memory 204. The processor 202 may comprise a single processor or multiple processors that may be disposed on a single chip, on multiple devices or distribute over more that one system. The processor 202 may be hardware that executes computer executable instructions or computer code embodied in the memory 204 or in other memory to perform one or more features of the system. The processor 202 may include a general processor, a central processing unit, a graphics processing unit, an application specific integrated circuit (ASIC), a digital signal processor, a field programmable gate array (FPGA), a digital circuit, an analog circuit, a microcontroller, any other type of processor, or any combination thereof.

The memory 204 may comprise a device for storing and retrieving data or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the process manager 102, the system interface 104 and/or any other application 206. The computer code may include instructions executable with the processor 202. The computer code may be written in any computer language, such as C, C++, assembly language, channel program code, and/or any combination of computer languages. The memory 204 may store information in data structures such as the process metadata repository 106 and the user-id metadata repository 112.

All of the disclosure, regardless of the particular implementation described, is exemplary in nature, rather than limiting. The system 100 may include more, fewer, or different components than illustrated in FIGS. 1 and 2. Furthermore, each one of the components of system 100 may include more, fewer, or different elements than is illustrated in FIGS. 1 and 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a central processing unit ("CPU").

A default set of privileges may be associated with each of one or more user-ids and stored in a data structure such as, for example, user-id metadata repository 112. The operating system may comprise a processor creator that is part of the kernel. The kernel may create one or more processes over time. Each created process may be owned by a user-id and may be assigned a default set of privileges associated with the user-id. The operating system may provided a means for receiving a request to modify the abilities of a process via, for example, a procedure call (a.k.a. a system call) that may be embodied in a linking library such as, for example, a 'C' library. The procedure call may be invoke by a process with the object of the call being the process itself. Alternatively or in addition, the procedure call invoked by a process other than the process that is the object of the call. The process that is the object of the request to modify may be identified by, for example, including in the request to modify a process identifier (pid) of the process. When the request to modify is received, the kernel may modify the set of privileges assigned to the process. The process creator may further create one or more child processes on behalf of the process. Each child process may be assigned the set of privileges assigned to it's parent process at the time of the child process' creation.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

We claim:

1. A computer implemented method for changing the abilities of a process comprising:
   associating, by a process manager, each of one or more user-ids with a default set of privileges;
   assigning to a process, by the process manager at process creation time, a default set of privileges based on the default set of privileges associated with a user-id of the one or more user-ids, wherein the user-id is an owner of the process;
   executing the process, wherein the assigned default set of privileges comprises process abilities that the process is authorized to have while executing in an operating system;
   receiving, at a system interface, a request from the process or from a different process to modify the assigned default set of privileges that was assigned to the process at process creation time; and
   modifying, by the process manager, the assigned default set of privileges assigned to the process to become a sub-set of the assigned default set of privileges assigned to the process, wherein the modification is applied responsive to the request from the process or from the different process received by the system interface, and the modification to the assigned default set of privileges is applied during subsequent execution of the process wherein the subset of the assigned default set of privileges comprises process abilities that the process is authorized to have while executing in the operating system subsequent to the modification.

2. The computer implemented method of claim 1, where modifying the set of privileges assigned to the process can be repeated responsive to further requests to modify the privileges assigned to the process.

3. The computer implemented method of claim 1, wherein the system interface receiving the request to modify the default set of privileges is an application programming interface (API), a procedure, a library or a system entry point.

4. The computer implemented method of claim 1, where the request to modify the default set of privileges comprises one or more abilities identifiers and corresponding modification action identifiers.

5. The computer implemented method of claim 4, where the abilities identified by each of the abilities identifiers comprise one or more of:
   changing the clock period, setting the clock;
   setting configuration strings;
   establishing a connection between a process and a channel;
   changing a processor's power management mode;
   triggering privileged system-wide events;
   creating a new process using a fork operation;
   getting the group ID or session ID of another process outside of the process's session;
   attaching an interrupt handler; requesting input /output (I/O) privileges;
   passing data through a common client; mapping fixed memory addresses;
   adding physical memory;
   marking shared memory as global across all processes;
   locking a range of process address space into physical memory;
   manipulating a peer process' memory;
   mapping physical memory;
   making shared memory special;
   adding items to the system process creator's pathname prefix space;
   setting the process' group ID;
   changing the process' priority to one above the maximum allowed for an unprivileged process;
   loading code into memory;
   creating a distributed processing channel;
   causing the system to reboot;
   raising hard limits on system resources;
   manipulating a resource database manager;
   controlling a processors running state;
   getting or setting a scheduling policy for a processor;
   changing a character terminal's process group or sending a signal to the a member of a session group;
   setting the process' group ID, effective group ID or supplementary group IDs;
   setting the process' user ID and effective user ID;
   attaching a signal handler to a process;
   spawning new processes;
   setting the group ID of a child process; setting the user ID of a child process;
   creating a timer that sends a pulse;
   adding handlers for trace events;
   changing the file-mode creation mask for a process; and
   waiting for the status of a terminated child process.

6. The computer implemented method of claim 4, where the action identified by each of the modification action identifiers comprise one or more of:
   denying an ability;
   allowing an ability;
   restricting the process to set an ability parameter within a specified sub-range;

locking an ability setting to prevent subsequent changes;
having child processes inherit an ability: and
not having child processes inherit an ability.

7. The computer implemented method of claim 1, where the request to modify the default set of privileges can only be generated by a further process owned by a system administrator user-id.

8. The computer implemented method of claim 1, where the request to modify the default set of privileges is generated by the process, whereby the process is able to modify its own abilities.

9. The computer implemented method of claim 1, where the set of privileges assigned to the process is assigned to one or more child processes of the process at each of the child process' creation time, whereby the one or more child processes each inherit the set of privileges or the sub-set of the default set of privileges based on which one is assigned to the process at the time when the child process is created.

10. The computer implemented method of claim 1, where at least one of the one or more user-ids is a system administrator user-id.

11. The computer implemented method of claim 10, where the default set of privileges associated with the system administrator user-id comprises all possible abilities.

12. A system for changing the abilities of a process comprising:
a processor; and
memory comprising:
  a process manager configured to create the process and assign to the process a default set of privileges based on a default set of privileges associated with a user-id that is an owner of the process wherein the assigned default set of privileges comprises process abilities that the process is authorized to have while executing in an operating system;
and
  a system interface configured to receive, from the process or from a different process, a request to modify the assigned default set of privileges that was assigned to the process at process creation time;
  wherein the process manager is further configured to modify the assigned default set of privileges assigned to the process to become a sub-set of the assigned default set of privileges assigned to the process during execution of the process, wherein the assigned default set of privileges is modified responsive to the system interface receiving the request to modify the assigned default set of privileges from the process or from the different process and the modification to the assigned default set of privileges is applied during subsequent execution of the process, wherein the subset of the assigned default set of privileges comprises process abilities that the process is authorized to have while executing in the operating subsequent to the modification.

13. The system of claim 12, wherein the process manager is further configured to modify the set of privileges assigned to the process responsive to further requests to modify the privileges being received by the system interface.

14. The system of claim 12, wherein the request to modify the default set of privileges comprises one or more abilities identifiers and corresponding modification action identifiers.

15. The system of claim 14, where the abilities identified by each of the abilities identifiers comprise one or more of:
changing the clock period, setting the clock;
setting configuration strings;
establishing a connection between a process and a channel;
changing a processor's power management mode;
triggering privileged system-wide events;
creating a new process using a fork operation;
getting the group ID or session ID of another process outside of the process's session;
attaching an interrupt handler; requesting input/output (I/O) privileges;
passing data through a common client; mapping fixed memory addresses;
adding physical memory;
marking shared memory as global across all processes;
locking a range of process address space into physical memory;
manipulating a peer process' memory;
mapping physical memory;
making shared memory special;
adding items to the system process creator's pathname prefix space;
setting the process' group ID;
changing the process' priority to one above the maximum allowed for an unprivileged process;
loading code into memory;
creating a distributed processing channel;
causing the system to reboot;
raising hard limits on system resources;
manipulating a resource database manager;
controlling a processors running state;
getting or setting a scheduling policy for a processor;
changing a character terminal's process group or sending a signal to the a member of a session group;
setting the process' group ID, effective group ID or supplementary group IDs;
setting the process' user ID and effective user ID;
attaching a signal handler to a process;
spawning new processes;
setting the group ID of a child process; setting the user ID of a child process;
creating a timer that sends a pulse;
adding handlers for trace events;
changing the file-mode creation mask for a process; and
waiting for the status of a terminated child process.

16. The system of claim 14, where the action identified by each of the modification action identifiers comprise one or more of:
denying an ability;
allowing an ability;
restricting the process to set an ability parameter within a specified sub-range;
locking an ability setting to prevent subsequent changes;
having child processes inherit an ability: and
not having child processes inherit an ability.

17. The system of claim 12, where the request to modify the default set of privileges can only be generated by a further process owned by a system administrator user-id.

18. The system of claim 12, where the request to modify the default set of privileges is generated by the process, whereby the process is able to modify its own abilities.

19. The system of claim 12, wherein the process manager is further configured to create and assign to one or more child processes of the process the set of privileges assigned to the process, whereby the one or more child processes inherit the set of privileges assigned to the process at the time when the child process is created.

20. The system of claim 12, where at least one of the one or more user-ids is a system administrator user-id.

21. The system of claim 20, where the default set of privileges associated with the system administrator user-id comprises all possible abilities.

22. A non-transitory computer-readable storage medium encoded with computer executable instructions, the computer executable instructions executable with a processor to change the abilities of a process, the computer-readable storage medium comprising:

instructions executable to associate with each of one or more user-ids a default set of privileges;

instructions executable to assign to a process, at process creation time, a default set of privileges based on the default set of privileges associated with a user-id of the one or more user-ids, wherein the user-id is an owner of the process;

instructions executable to execute the process, wherein the assigned default set of privileges comprises process abilities that the process is authorized to have while executing in an operating system;

instructions executable to receive at a system interface, a request from the process or from a different process to modify the assigned default set of privileges that was assigned to the process at process creation time; and instructions executable to modify the assigned default set of privileges assigned to the process to become a sub-set of the assigned default set of privileges assigned to the process, wherein the modification is applied responsive to the request from the process or from the different process received by the system interface, and the modification to the assigned default set of privileges is applied during subsequent execution of the process wherein the subset of the assigned default set of privileges comprises process abilities that the process is authorized to have while executing in the operating system subsequent to the modification.

23. The non-transitory computer-readable storage medium of claim 22, where the request to modify the default set of privileges comprises one or more abilities identifiers and corresponding modification action identifiers.

24. The non-transitory computer-readable storage medium of claim 22, where the set of privileges assigned to the process is assigned to one or more child processes of the process at each of the child process' creation time, whereby the one or more child processes each inherit the set of privileges assigned to the process at the time when the child process is created.

25. The computer implemented method of claim 2 wherein the further requests to modify the privileges are received at different points of time in the lifespan of the process and an effect of multiple requests to modify the privileges are cumulative on the set of privileges assigned to the process.

* * * * *